United States Patent
Nagata et al.

(10) Patent No.: US 7,540,006 B2
(45) Date of Patent: May 26, 2009

(54) OPTICAL INFORMATION RECORDING MEDIUM AND MANUFACTURE METHOD THEREOF

(75) Inventors: Ken'ichi Nagata, Nishinomiya (JP); Kenichi Nishiuchi, Hirakata (JP); Hideki Kitaura, Souraku-gun (JP); Hideo Kusada, Osaka (JP); Noboru Yamada, Hirakata (JP); Shinya Abe, Kadoma (JP)

(73) Assignee: Panasonic Corporation, Osaka (JP)

( * ) Notice: Subject to any disclaimer, the term of this patent is extended or adjusted under 35 U.S.C. 154(b) by 367 days.

(21) Appl. No.: 10/567,356

(22) PCT Filed: Aug. 5, 2004

(86) PCT No.: PCT/JP2004/011239

§ 371 (c)(1),
(2), (4) Date: Mar. 6, 2006

(87) PCT Pub. No.: WO2005/015555

PCT Pub. Date: Feb. 17, 2005

(65) Prior Publication Data

US 2006/0146685 A1    Jul. 6, 2006

(30) Foreign Application Priority Data

Aug. 7, 2003   (JP) .............................. 2003-288787

(51) Int. Cl.
  *G11B 7/24* (2006.01)
(52) U.S. Cl. .................... 720/718; 369/275.4; 369/277; 369/278; 369/279
(58) Field of Classification Search ................. 720/718; 369/275.4, 277, 278, 279
See application file for complete search history.

(56) References Cited

U.S. PATENT DOCUMENTS 5,283,690 A * 2/1994 Miyake et al. .............. 359/566

(Continued)

FOREIGN PATENT DOCUMENTS

EP    0 911 820    4/1999

(Continued)

OTHER PUBLICATIONS

Chinese Office Action (in English language) issued Sep. 14, 2007.

(Continued)

*Primary Examiner*—William J Klimowicz
(74) *Attorney, Agent, or Firm*—Wenderoth, Lind & Ponack, L.L.P.

(57) ABSTRACT

An optical information recording medium includes one or more information layers including a recording layer for recording/reproducing an information signal by irradiation with a laser light, and a seperating layer or a protective substate on which a first information layer of the information layer on the irradiation face side is formed. The seperating layer or the protective substrate having a guide groove spirally or concentrically formed on the surface, and the respective inclined planes on the inner perimeter side and the outer perimeter side of the guide groove having inclined angles $\alpha$ and $\beta$ with respect to the bottom face of the guide groove. The guide groove has one or more dissymmetric regions in the radius direction where the inclined angles $\alpha$ and $\beta$ are different. The information layer has roughly agreeing thicknesses in the inclined face portion on the inner and outer perimeter sides in the dissymmetric region.

8 Claims, 4 Drawing Sheets

U.S. PATENT DOCUMENTS

| | | | |
|---|---|---|---|
| 5,883,879 A * | 3/1999 | Fukuoka et al. | 369/275.4 |
| 5,946,288 A * | 8/1999 | Ogawa | 369/275.4 |
| 6,108,297 A | 8/2000 | Ohta et al. | |
| 6,180,208 B1 * | 1/2001 | Shiratori et al. | 428/141 |
| 6,287,660 B1 * | 9/2001 | Hosaka et al. | 428/64.1 |
| 6,456,584 B1 | 9/2002 | Nagata et al. | |
| 2002/0036978 A1 * | 3/2002 | Shimizu | 369/275.4 |

FOREIGN PATENT DOCUMENTS

| | | |
|---|---|---|
| EP | 1 189 220 | 3/2002 |
| EP | 1 333 430 | 8/2003 |
| JP | 1-315044 | 12/1989 |
| JP | 9-320100 | 12/1997 |
| JP | 10-154351 | 6/1998 |
| JP | 2000-36130 | 2/2000 |
| JP | 2000-322774 | 11/2000 |
| JP | 2000322773 A * | 11/2000 |
| JP | 2002117588 A * | 4/2002 |
| WO | 02/29789 | 4/2002 |

OTHER PUBLICATIONS

International Search Report issued Mar. 14, 2008 in the International (PCT) Application of which the present application is the U.S. National Stage.

* cited by examiner

Inner perimeter side ←    Outer perimeter side →

OPTICAL INFORMATION RECORDING MEDIUM AND MANUFACTURE METHOD THEREOF

BACKGROUND OF THE INVENTION

1. Field of the Invention

The present invention relates to an optical information recording medium for recording/reproducing a large volumetric information signal by means of a laser light, and a method for producing the same.

2. Description of the Related Art

As optical information recording mediums capable of recording/reproducing a signal by means of a laser light, there exist a phase change type optical disc, a magnetic optical disc, a dye disc and the like. Among those discs, in the phase change type optical disc which is capable of recording/erasing a signal, a typical material to be used for a recording layer is chalcogenide. Generally, the recording layer is regarded as an unrecorded state when the material for the recording layer is in a crystal state. A signal is recorded on the recording layer such that the recording layer material is irradiated with a laser light to be melted and quenched so as to come into an amorphous state. On the other hand, in the case of erasing a signal, the recording layer material is irradiated with a smaller power laser light than at the time of recording, so as to come into a crystal state. Since the recording layer comprising chalcogenide is formed while in the amorphous state, it is necessary to previously crystallize the whole surface of the recording region to obtain an unrecorded state. Such crystallization of the whole surface of the recording region is called initialization.

As a technique for realizing high density of the recordable/erasable phase change type optical disc, it has been proposed to use a blue laser light having a wave length of about 410 mm as a light source for recording/reproduction in place of a conventionally commonly used red laser light, to increase the numerical aperture of an objective lens of an optical system, which applies the laser light for recording/reproduction onto the optical disc, from the conventional commonly used numerical aperture of 0.60 to about 0.85, thereby reducing the size of a laser light spot. It has also been proposed that, in the case of using the objective lens with the numerical aperture thereof made as large as 0.85, a transparent protective substrate on the laser light incident side have a smaller thickness, such as 0.1 mm, than the 0.6 mm thickness of the substrate of an already commercialized DVD-RAM, for the purpose of securing tilt tolerance of an optical information recording medium in terms of recording/reproduction characteristics (e.g., cf. Japanese Patent Laid-Open Publication No. 10-154351).

Further, as a technique for multiplying a recording capacity per face, a medium with a single-sided multi-layered configuration has been proposed (e.g., cf. Japanese Patent Laid-Open Publication No. 2000-036130). Moreover, a technique concerning production of a substrate of an optical disc having a guide groove on the surface thereof is also known (e.g., cf. Japanese Patent Laid-Open Publication No. 09-320100).

However, the experiments performed by the present inventors revealed the following. In the single-sided multi-layered phase change optical disc which performs recording/reproduction by means of a blue laser light, on the information layer on the side closer to the laser light source, a noise level of the disc after recording especially in the outer perimeter region degrades as compared with the inner and the middle perimeter regions. The cross section of this disc was observed with a transmission electron microscope, to find that the guide groove itself has an almost symmetric shape with respect to the center thereof over the whole region from the inner perimeter to the outer perimeter of the disc, thus having no particular problem. However, in the outer perimeter region of the disc, there was recognized a remarkable difference, e.g., about 20%, in thickness of the information layer between an inclined face portion on the inner perimeter side and an inclined face on the outer perimeter side of the guide groove.

The cause-effect relationship between the difference in layer thickness and the high noise level can be explained by considering a thermal aspect and an optical aspect as described below. First, when the layer thicknesses are different between the inclined face portion on the inner perimeter side and the inclined face portion on the outer perimeter side of the guide groove, the respective heat capacities are different, to cause the respective diffusion rates to be different. This leads to formation of a mark shape dissymmetric and distorted with respect to the track center, thereby increasing the noise level. Further, optical characteristics such as a reflectance with respect to the laser light become different between the inclined face on the inner perimeter side and the inclined face on the outer perimeter side of the guide groove, and the spot center of the laser light is thus displaced from the track center, causing a normal tracking operation to be ceased. As a result of performing a recording operation in such a state, the noise level increases.

Further, recording mediums having been put to practical use so far are not multi-layered recording mediums but recording mediums having only a single information layer. Hence in those recording mediums, a laser light is not required to be transmitted through the information layer, and for example, the reflective layer and the like are made sufficiently thick to such a degree that a transmittance thereof is almost zero. In such a state, even when the layer thickness is different between the inclined face portion on the inner perimeter side and the inclined face portion on the outer perimeter side of the guide groove, a difference in thermal or optical characteristics therebetween is considered as being in an ignorable level. As opposed to this, the information layer on the nearer side from the laser source in the multi-layered recording medium is required to have a constant transmittance of not smaller than 30%, for example, and the thermal or optical characteristics thereof are considered to be very sensitive to the difference in layer thickness, unlike the recording medium having a single information layer or the information layer on the farther side from the laser light source.

Almost all those skilled in the art form a thin layer constituting an information layer by placing a substrate and a target so as to be mutually opposed and then sputtering is performed, and the present inventors also form the thin layer in this manner. It is difficult to employ other methods for the layer formation from the perspective of convenience and practicability of a layer forming device and a layer forming rate. Generally, since recording by means of a laser light is performed by forming a mark in the guide groove and/or a flat portion between the guide grooves, the layer forming device is designed so as to keep the layer thickness uniform in the flat portion from the inner perimeter region to the outer perimeter region of the disc. However, as for the inclined face of the guide groove, an angle and a rate of particles flying by sputtering from a target as a raw material of the layer are not uniform from the inner perimeter region to the outer perimeter region of the disc. This causes some portions of the inclined face on the inner perimeter side and the inclined face on the outer perimeter side of the disc to have different thicknesses by the shadowing effect. However, since no mark is formed on the inclined face of the guide groove, and the inclined face has thus been considered to exert no direct influence on the recording/reproduction characteristics, an attempt has not been made to keep the layer thickness uniform with high accuracy between the inclined face portion on the inner perimeter side and the inclined face portion on the outer perimeter side of the guide groove over the whole region from the inner perimeter region to the outer perimeter region of the disc.

Accordingly, it is an object of the present invention to solve the above-mentioned problems and provide an optical information recording medium with favorable signal quality even in high density recording using a translucent information layer.

SUMMARY OF THE INVENTION

In order to solve the above-mentioned problems, an optical information recording medium of the present invention comprises one or more information layers including a recording layer for recording/reproducing an information signal by irradiation with a laser light, and a separating layer or a protective substrate on which a first information layer of the information layer on the irradiation face side is formed. The separating layer or the protective substrate has a guide groove spirally or concentrically formed on the surface, and the respective inclined planes on the inner perimeter side and the outer perimeter side of the guide groove have inclined angles $\alpha$ and $\beta$ with respect to the bottom face of the guide groove. The guide groove has one or more dissymmetric regions where the inclined angles $\alpha$ and $\beta$ are different.

Further, as the optical information recording medium of the present invention, one can be used which has two or more of the dissymmetric regions in the radius direction.

Further, as the optical information recording medium of the present invention, one can be used in which the inclined angle $\beta$ is smaller than the inclined angle $\alpha$. For example, one having a relation: $\alpha-\beta \geq 20$ degrees can be used.

Further, as the optical information recording medium of the present invention, one can be used in which the protective substrate has a radius r, and the dissymmetric region is formed at a distance farther than r/2 from the center of the protective substrate in the radius direction.

Further, as the optical information recording medium of the present invention, one can be used in which the dissymmetric region consists of first and second dissymmetric regions, and has a relation: $\alpha-\beta \leq 10$ degrees in the first dissymmetric region, and a relation: $\alpha-\beta \geq 20$ degrees in the second dissymmetric region.

Further, as the optical information recording medium of the present invention, one can be used in which the first dissymmetric region is formed at a distance smaller than r/2 from the center of the protective substrate in the radius direction, whereas the second dissymmetric region is formed at a distance larger than r/2 from the center of the protective substrate in the radius direction.

Further, as the optical information recording medium of the present invention, one can be used which has a single-sided multi-layered configuration, where at least a second information layer, a separating layer having a second guide groove and the first information layer are sequentially laminated on the protective substrate having the first guide groove.

Further, as the optical information recording medium of the present invention, one can be used in which the information layer has roughly agreeing thicknesses in the inclined face portion on the inner perimeter side and in the inclined face portion on the outer perimeter side in the dissymmetric region.

In the optical information recording medium of the present invention, since the protective substrate with an information layer formed on the surface thereof or a separating layer has, on the surface, the guide groove having one or more dissymmetric regions in the radius direction where the inclined angles $\alpha$ and $\beta$ are different, the influence of the shadowing effect at the time of forming the information layer can be reduced. Hence it is possible to allow rough agreement of the thickness of the first information layer between the inclined face portion on the inner perimeter and the inclined face portion on the outer perimeter side of the guide groove, so as to lower the noise level at the time of reproduction. It is thereby possible to provide an optical information recording medium with favorable signal quality also in the high density recording onto the transparent information layer. This technique is particularly effective for the information layer on the laser light incident side in the single-sided multi-layered configuration comprising two or more information layers separated with a separating layer.

The optical information recording medium of the present invention can be produced using the following method, for example. Namely, it is a method for producing an optical information recording medium comprising one or more information layers including a recording layer for recording/reproducing an information signal by irradiation with a laser light, and a separating layer or a protective substrate on which a first information layer of the information layer on the irradiation face side is formed. The separating layer or the protective substrate has a guide groove spirally or concentrically formed on the surface, and the respective inclined planes on the inner perimeter side and the outer perimeter side of the guide groove has inclined angles $\alpha$ and $\beta$ with respect to the bottom face of the guide groove. The guide groove has one or more dissymmetric regions where the inclined angles $\alpha$ and $\beta$ are different. The protective substrate is formed by molding with a stamper as a mold produced from a master, and as the master, one is used which has a dissymmetric region where the inclined angles $\alpha$ and $\beta$ are different.

Further, the production method includes forming a resist layer on a substrate for a master, collecting a laser light with a condenser lens to cut the resist layer for forming a mask pattern, and etching the mask pattern to form a spiral or concentric guide groove, and it is possible to use a method for inclining a light axis of the laser light to be incident on the condenser lens in order to cut the resist layer.

Further, the production method includes forming a resist layer on a substrate for a master, collecting a laser light with a condenser lens to cut the resist layer for forming a mask pattern, and etching the mask pattern to form a spiral or concentric guide groove, and it is possible to use a method for using two collected laser lights in order to cut the resist layer.

DETAILED DESCRIPTION OF THE PREFERRED EMBODIMENT

In the following, embodiments of the present invention are specifically described with reference to drawings.

Embodiment 1

Figure 1:
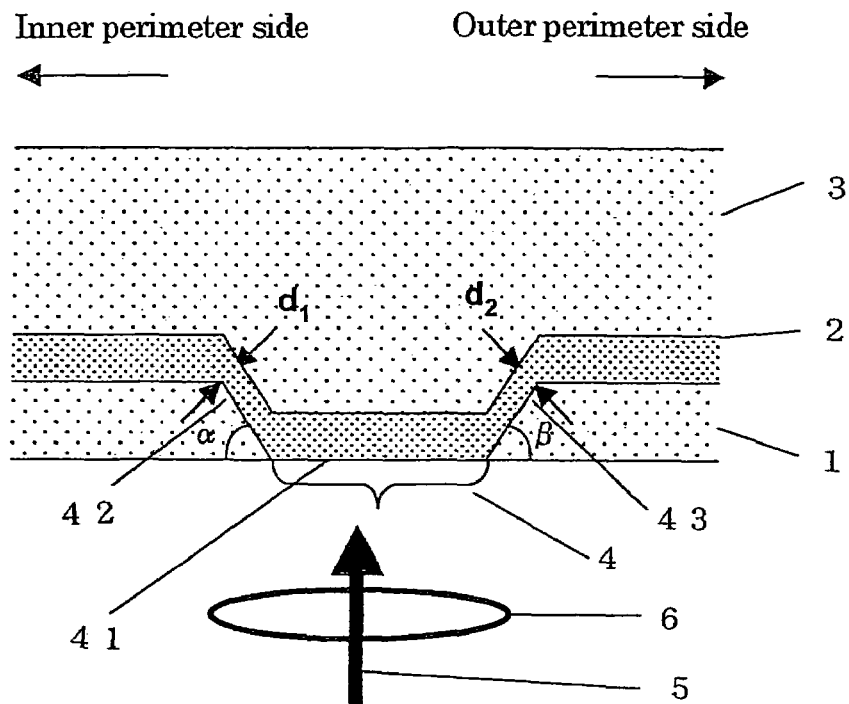
FIG. 1 is a schematic sectional view showing one example of a configuration of an optical information recording medium according to a first embodiment of the present invention.

FIG. 1 shows one example of a configuration of a single-layered optical information recording medium according to the present embodiment. The optical information recording medium according to the present embodiment comprises a translucent first information layer 2 between a disc-like transparent substrate 1 and a protective substrate 3. The first information layer 2 has a spiral guide groove 4 for guiding a laser light, and records/reproduces information by irradiation with a laser light. Here, "translucent" means having a transparency of at least 30% in a wavelength of a laser light with which recording/reproduction are performed. Further, an inclined face 42 on the inner perimeter side and an inclined face 43 on the outer perimeter side of the guide groove 4 respectively have inclined angles α and β with respect to a bottom face 41. Further, the first information layer 2 has respective thicknesses $d_1$ and $d_2$ in the inclined face 42 portion on the inner perimeter side and the inclined face 43 portion on the outer perimeter side. A laser light 5 is collected with an objective lens 6 and applied onto the optical information recording medium from the side of the transparent substrate 1.

In the present embodiment, since the guide groove has a dissymmetric region with an inclined angle β smaller than an inclined angle α, the influence of the shadowing effect at the time of layer formation can be reduced. This enables rough agreement of thickness of the first information layer between the inclined face portion on the inner perimeter side and the inclined face portion on the outer perimeter side of the guide groove. It is thereby possible to lower a noise level at the time of reproduction. Here, the rough agreement means that the ratio of $d_2/d_1$ is in the range of 1±0.05.

Embodiment 2

Figure 2:
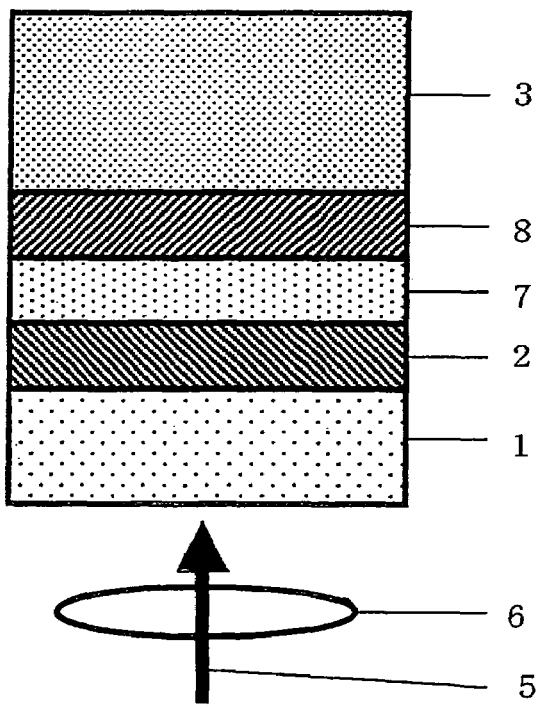
FIG. 2 is a sectional view of an example of a configuration of an optical information recording medium according to a second embodiment of the present invention.

An optical information recording medium according to the present embodiment has a one-sided multi-layered configuration as shown in the schematic sectional view of FIG. 2. This recording medium has two information layers which are first and second information layers. The second information layer 8, the separating layer 7 and the first information layer 2 are sequentially laminated on the protective substrate 3.

Figure 3:
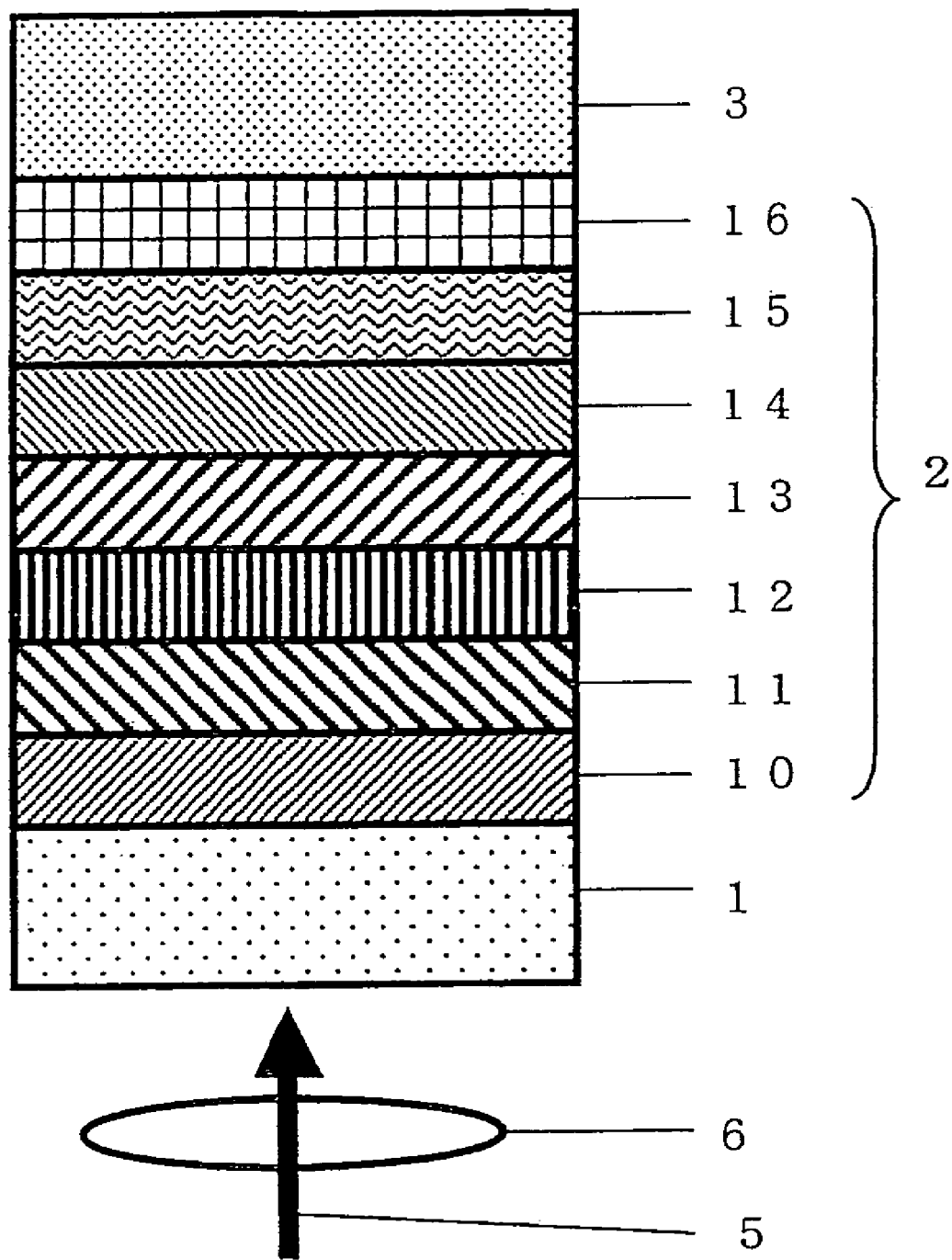
FIG. 3 is a schematic sectional view showing an example of a configuration of an information layer to be used for the optical information recording medium of the present invention.

Further, FIG. 3 shows a sectional view of one example of a multi-layered layer composition of the first information layer 2. The first information layer 2 is constituted by sequentially laminating a lower side dielectric layer 10, a lower side interface layer 11, a recording layer 12, an upper side interface layer 13, an upper side dielectric layer 14, a reflective layer 15, and a transparency adjusting layer 16 in this order from the side closer to the transparent substrate 1. Those layers except the recording layer 12 can be omitted.

Figure 4:
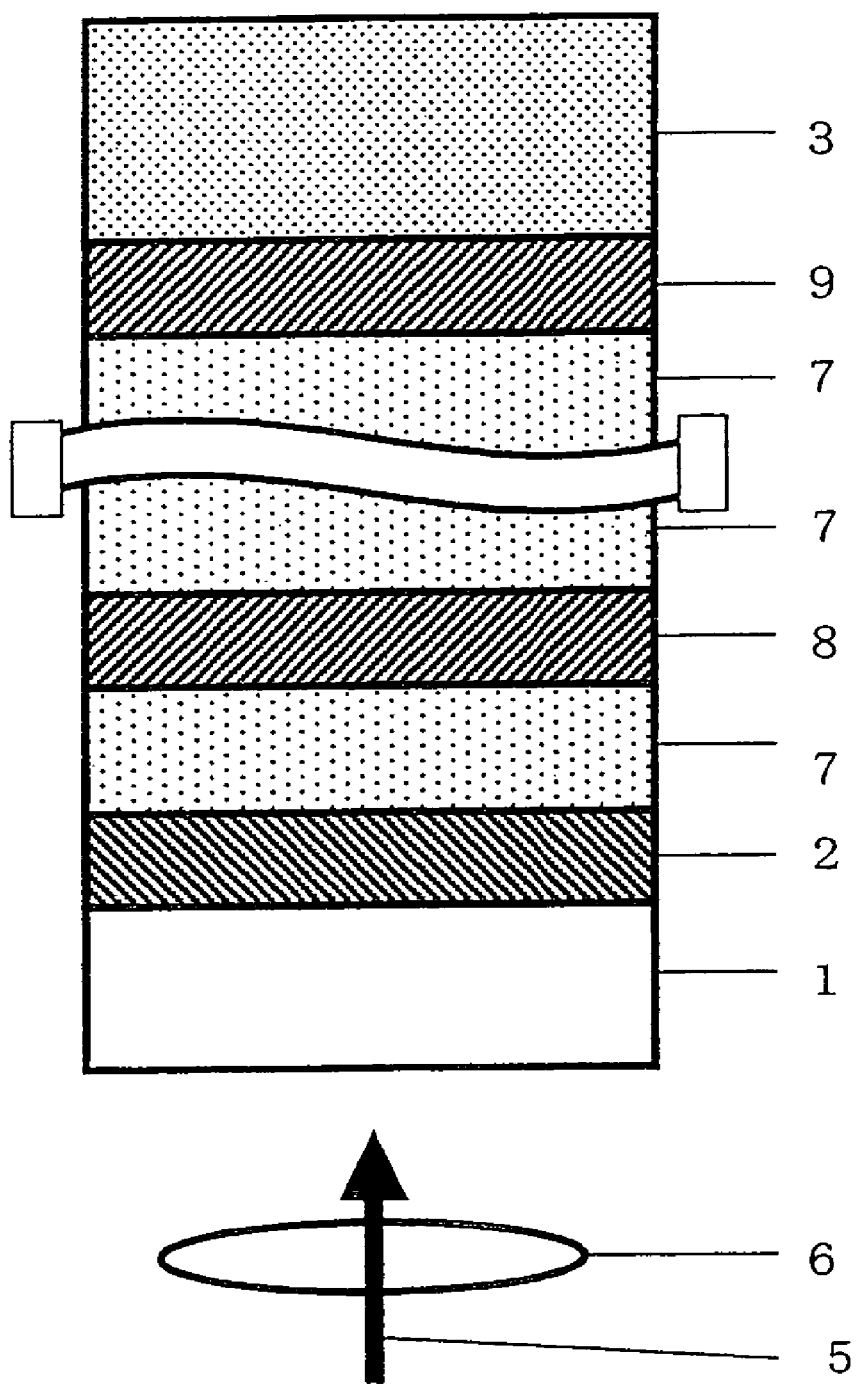
FIG. 4 is a schematic sectional view showing an example of another configuration of an optical information recording medium according to the second embodiment of the present invention.

In this embodiment, in addition to obtainment of the same effect as that of Embodiment 1, a higher density recording is possible due to the arrangement of a plurality of information layers. It should be noted that, in the embodiment, the number of information layers is not limited to two, and as shown in FIG. 4, an n-th information layer 9 (n is an integer not smaller than 3) can be provided between the first information layer 2 and the protective substrate 3 via the separating layer 7.

The configuration of and the production method for the optical information recording medium according to Embodiments 1 and 2 are specifically described below.

As a material for the transparent substrate 1, one substantially transparent in the wavelength of the laser light 5 is preferred, and a polycarbonate resin, a polymethyl methacrylate resin, a polyolefin resin, a norbornene resin, an ultraviolet ray-thermosetting resin, glass, a combination of these, or the like, can be used. Further, although the thickness of the transparent substrate 1 is not particularly restricted, one having a thickness of about 0.01 to 1.5 mm can be employed.

The lower side dielectric layer 10 and the upper side dielectric layer 14 are provided for the purposes including prevention of evaporation of the recording layer or thermal transformation of the substrate when recording is repeated, and further, enhancement of a light absorption coefficient and an optical change of the recording layer by the optical interference effect. As the material for the lower side dielectric layer 10 and the upper side dielectric layer 14, a dielectric material having excellent heat resistance, or the like, is used. For example used can be an oxide of Y, Ce, Ti, Zr, Nb, Ta, Co, Zn, Al, Si, Ge, Sn, Pb, Sb, Bi or Te, a nitride of Ti, Zr, Nb, Ta, Cr, Mo, W, B, Al, Ga, In, Si, Ge, Sn or Pb, a carbide of Ti, Zr, Nb, Ta, Cr, Mo, W or Si, a sulfide of Zn or Cd, selenide, telluride, a fluoride of rare earth such as Mg, Ca or La, a simple substance such as C, Si, Ge or a mixture of these. Above all, a substantially transparent material having low thermal conductivity, e.g., a mixture of ZnS and $SiO_2$, is preferred. For the lower side dielectric layer 10 and the upper side dielectric layer 14, different materials with different compositions may be used according to need or the same material with the same composition can also be used.

The lower side interface layer 11 and the upper side interface layer 13 are provided in contact with the recording layer 12 for the purposes including promotion of crystallization of the recording layer 12, improvement in erasing characteristic, and prevention of mutual diffusion of atoms/molecules between the recording layer 12 and the lower side dielectric layer 10, and/or between the recording layer 12 and the upper side dielectric 14 so as to improve durability in the repeated recording. Further, the lower side interface layer 11 and the upper side interface layer 13 are required to have environmental reliability, like giving rise to peeling from or corrosion with the recording layer 12. Some of the materials cited above as the material for the lower side dielectric layer 10 and upper side dielectric layer 14 can serve as a material for the lower side interface layer 11 and the upper side interface layer 13. For example, a nitride based upon Ge, Si or the like, an oxide of Ti, Zr, Hf, V, Nb, Ta, Cr, Mo, W or Si, a composite oxide of these can be used. Above all, a material obtained by adding an oxide of Cr, Mo or W to an oxide of Ti, Zr, Hf, V, Nb or T as a base is excellent in terms of moisture resistance, and moreover, a material obtained by adding an oxide of Si to the above-mentioned base can further increase an erase rate. The respective thicknesses of the lower side interface layer 11 and the upper side interface layer 13 are not particularly restricted. However, the effect as the interface layer cannot be exerted when the layer thickness is too small, while recording sensitivity is lowered or the like when the layer thickness is too large, and hence the preferable thickness of each of the lower side interface layer 11 and the upper side interface layer 13 is for example not less than 0.2 nm and not more than 20 nm. Although the above-mentioned effect is exerted even by arrangement of either the lower side interface layer 11 or the upper side interface layer 13, arrangement of both interface layers is more preferred. In the case of arranging both the layers, different materials with different compositions may be used according to need or the same material with the same composition can also be used. When the upper side interface layer 13 is used, the upper side dielectric layer 14 can be omitted, and in such a case, the thickness of the upper side interface layer 13 is preferably from not less than 2 nm and not more than 50 nm.

The recording layer 12 can be broadly classified into a rewritable type and a recordable type. As a rewritable recording layer 12 suitably used is a phase change recording material, namely a material mainly composed of a chalcogen material of Te and/or Sb. Above all, a material system obtained by mixing compositions of two compounds, GeTe and $Sb_2T_3$, in an appropriate rate is preferred since a crystallization rate is high and recording/reproducing characteristics can readily be held even when the layer thickness is made smaller for increasing transparency. In order to increase the crystallization rate of this material system, part of Ge can be replaced with Sn, or part of Sb can be replaced with Bi, and it is further preferable to use a composition expressed by a general formula: $(Ge_xSn_{1-x})_z(Sb_yBi_{1-y})_2Te_{2+3}$ where $0.5 < x \leq 1$, $0 \leq y \leq 1$, $z \geq 1$. With $x \geq 1$, a reflectance and a change in reflectance can be made large. For the purposes including adjustment of a crystallization rate, thermal conductivity, an optical constant or the like, or improvement in repetition durability, heat resistance or environmental reliability, the above-mentioned material composition may be appropriately added with one or more elements selected from metals such as In, Ga, Zn, Cu Ag, Au, Cr, additional metals such as Ge, Sn, Sb, Bi and Te, semimetals or semiconductor elements, a nonmetal elements such as O, N, F, C, S and B, according to need, in the range not larger than 10 atomic %, or more preferably not larger than 5 atomic %, of the total composition of the recording layer 12.

When the thickness of the rewritable recording layer 12 is not less than 2 nm and not more than 20 nm, and more preferably not less than 4 nm and not more than 14 nm, a sufficient C/N ratio can be obtained. With the thickness of the recording layer 12 being too small, a sufficient reflectance and a sufficient change in reflectance cannot be obtained, and hence the C/N ratio is low. With the thickness of the recording layer 12 being too large, heat diffusion within the thin layer surface of the recording layer 12 is large, and hence the C/N ratio is low in high density recording.

The rewritable phase change recording material as thus described is amorphous in the state of having been formed into a layer. Generally, for recording an information signal, the layer of the phase change recording material is annealed by means of a laser light or the like to be crystallized for initialization, and with this layer regarded as in an initialized state, an amorphous mark is formed.

Further, as a recordable recording layer 12, for example, an inorganic material such as a phase change recording material based upon a metal having a relatively low melting point, like Te, Sb, Bi, Sn, In or Ga, or a metal oxide, or an organic material such as dye. Among them, a material based upon Te oxide is suitable for the recordable recording layer since it allows nonreversible crystallization recording, and is also suitable for a recording layer to be used for a translucent information layer since it makes it easier to realize a high transparency. For example, a material mainly composed of Te, O, and M (M is one or more elements selected from Al, Si, Ti, V, Cr, Mn, Fe, Co, Ni, Cu, Zn, Ga, Ge, Zr, Nb, Mo, Ru, Rh, Pd, Ag, In, Sn, Sb, Hf, Ta, W, Re, Os, Ir, Pt, Au and Bi). The most preferable ones as the element M are Pd and Au. With these elements added, a crystallization rate is improved so as to secure high environmental reliability.

This material preferably has a composition containing O atoms in the range not smaller than 25 atomic % and not larger than 60 atomic %, and M atoms in the range not smaller than 1 atomic % and not larger than 35 atomic %. With the O atoms less than 25 atomic %, the thermal conductivity of the recording layer may become excessively high, resulting in an extremely large recording mark. This makes it difficult to increase the C/N ratio even if recording power is raised. As opposed to this, with the O atoms exceeding 60 atomic %, the thermal conductivity of the recording layer becomes excessively low, resulting in an insufficiently large recording mark even if recording power is raised. This thus makes it difficult to realize a high C/N ratio and high recording sensitivity. With the M atom less than 1 atomic %, an action to promote growth of Te crystals becomes relatively small at the time of irradiation with a laser light, resulting in an insufficiently low crystallization rate of the recording layer 12. This prevents formation of a mark at a high rate. As opposed to this, with the M atom exceeding 35 atomic %, a change in amorphous-crystal reactance may decrease to lower the C/N ratio. Further, for the purposes including adjustment of thermal conductivity or an optical constant, or improvement in heat resistance or environmental reliability, the above-mentioned material composition can be appropriately added with one or more elements selected from nonmetal elements such as N, F, C, S and B, according to need, in the range not larger than 10 atomic %, or more preferably not larger than 5 atomic %, of the total composition of the recording layer 12.

Generally, the recordable type phase change recording material as thus described is amorphous in a state of having been formed into a layer, and with this state regarded as an initial state, crystallization recording is performed, and thus an initialization process is not required. However, it is preferable to anneal this material at a high temperature of about 60 to 100° C. for a fixed period of time so as to stabilize the initial state.

When the above-mentioned recordable recording layer 12 has a thickness of not less than 2 nm and not more than 70 nm, and more preferably not less than 4 nm and not more than 30 nm, a sufficient C/N ratio can be obtained. With the thickness of the recording layer 12 being too thin, a sufficient reflectance and change in reflectance cannot be obtained, resulting in a low C/N ratio. With the thickness of the recording layer 12 being too large, heat diffusion in the thin layer of the recording layer 12 is excessively large, resulting in a low C/N ratio.

The reflective layer 15 is provided for the purposes including the effective use of an incident light to improve a cooling rate so as to facilitate amorphization. As a material for the reflective layer 15, a metal, an alloy and the like, eg. Au, Ag, Cu, Al, Ni, Cr, or an alloy material based upon these can be used. Above all, an Ag alloy is preferred since having high thermal conductivity and a high reflectance, and Al alloy is also preferred from the cost aspect. Further, a plurality of reflective layers in combination may be used.

The transparency adjusting layer 16 is provided for the purpose of increasing transparency while a change in reflectance of the first information layer is kept high. As a material for the transparency adjusting layer 16, a translucent material having a high refraction index can be used e.g., a material mainly composed of $TiO_2$, $Bi_2O_3$, $Nb_2O_5$, $ZrO_2$, $HfO_2$, $Ta_2O_5$, or a mixture of these. Above all, a material mainly composed of $TiO_2$ is most preferred since it has a refraction index of about 2.7.

As a material for the protective substrate 3, while the same ones as those mentioned as the material for the transparent substrate 1 can be used, a different material from those may also be used. Further, a material to be used may not be necessarily transparent in the wavelength of the laser light 5. Although the thickness of the protective substrate 3 is not particularly restricted, a substrate having a thickness of about 0.01 to 3.0 mm can be used as the protective substrate 3.

As for the separating layer 7, an ultraviolet ray-curable resin or the like can be used. In order that, when one of the two information layers adjacent to the separating layer 7 is reproduced, cross talk from the other information layer is made small, the separating layer 7 needs to have a thickness at least not smaller than a focal depth determined by the numerical aperture (NA) in the objective lens 6 and a wavelength ($\lambda$) of the laser light 5, and further, each of the information layers needs to have a thickness within a light collectable range. For example, the thickness of the separating layer 7 needs to be not less than 10 μm and not more than 100 μm when $\lambda$=660 nm and NA=0.6, and needs to be not less than 5 μm and not less than 50 μm when $\lambda$=405 nm and NA=0.85. However, if an optical system capable of reducing cross talk between layers is developed, the thickness of the separating layer 7 may be made thinner than the above-mentioned thicknesses.

As the second information layer 8 and the n-th information layer 9, a recordable type or reproduction-only type information layer, as well as a rewritable type information layer, can be applied.

It is further possible to bond two of the above-mentioned optical information recording mediums together such that the respective faces thereof on the side of the protective substrate 3 are mutually opposed, to give a double-sided configuration. This can double a storable amount of information per medium.

Each of the above-mentioned thin layers can be formed for example by a phase thin layer deposition method, such as vapor deposition, sputtering, ion-plaiting, CVD (Chemical Vapor Deposition), or MBE (Molecular Beam Epitaxy). Above all, sputtering is preferred since it is practical from the aspect of the layer formation rate and the device cost.

In sputtering, a substrate and a target comprising a layer material are mutually opposed for layer formation, as thus described above. It is however difficult to make the layer thickness difference small between the inclined face portion on the inner perimeter side and the inclined face portion on the outer perimeter side of the guide groove 4 over the whole region of the disc. Especially in a sputtering device designed so as to secure a layer thickness distribution in the radius direction of the disc, the layer thickness difference tends to be large between the two inclined face portions in the outer perimeter region. For clearing the layer thickness difference, a conventional approach has been to make the guide groove 4 shallow to reduce the inclined angle of the guide groove in the outer perimeter region where the layer thickness difference is large between the inclined face portion on the inner perimeter side and the inclined face portion on the outer perimeter side of the guide groove. The guide groove can be made shallow for example such that, in an optical disc master recording device, a diaphragm of a master recording light is made small to form a master having a shallow guide groove, and from the obtained master, a protective substrate is produced by means of resin formation or the like.

However, when the inclined angle of the guide groove is made small, the quality of a tracking error signal obtained from the guide groove deteriorates. For suppressing the deterioration in tracking error signal quality, it is effective not to merely make the inclined angle small, but to make the inclined angle small only in the inclined face portion, where the thickness of the information layer is conventionally small, which is either the inclined face portion on the inner perimeter side or the inclined face portion on the outer perimeter side of the guide groove. The present inventors have found that, in the outer perimeter region of the optical disc, the thickness ($d_2$ in FIG. 1) of the information layer in the inclined face portion on the outer perimeter side of the guide groove tends to be smaller than the thickness ($d_1$ in FIG. 1) of the information layer in the inclined face portion on the inner perimeter side. In the outer perimeter region, reduction in thickness of the information layer in the inclined face portion can be suppressed by making the inclined angle small on the outer perimeter side of the guide groove. The inclined angle on the outer perimeter side is preferably made smaller than the inclined angle on the inner perimeter side, by an angle difference of 20 degrees or larger, and more preferably 25 degrees or larger. This has permitted effective suppression of the noise increase in the outer perimeter region.

For setting a difference in inclined angle between the outer perimeter side and the inner perimeter side to make the guide groove dissymmetric, for example, a master can be used which has a dissymmetric region where the above-mentioned inclined angles $\alpha$ and $\beta$ are different. In the following, a method for producing a master is described while comparing with a conventional master producing method.

The conventional method is performed as follows. A resist layer is formed by spin coating or the like on a master substrate, and the formed resist layer is exposed and developed so as to form a guide groove pattern by laser cutting performed by irradiation with a laser light collected through a condenser lens, thereby forming a desired mask pattern. Subsequently, the master substrate is etched for example by dry etching to remove the resist layer, thereby obtaining a master. A metal layer made of nickel or the like is formed by sputtering on the surface of the master, and the metal layer is then metal-plated by electroforming to form a metal body part. Thereafter, the master is peeled off to obtain a metal stamper. With this stamper used as a mold, a resin is formed into a protective substrate.

In the present invention, at the time of producing a master, for example, a light axis of a laser light to be incident on the condenser lens is inclined to cut a resist layer. With the light axis of the laser light inclined, coma-aberration is generated so that the respective inclined angles on the inner perimeter side and the outer perimeter side can be made different. For example, a laser light for cutting is inclined toward the central angle to be incident on the master so that the inclined angle on the outer perimeter side of the guide groove is made smaller than the inclined angle on the inner perimeter side of the same groove.

Further, the resist layer can be cut using the two collected laser lights. For example, when the inclined face on the outer perimeter side of the guide groove is irradiated with two collected laser lights, the lights blur, and as a result, the inclined angle on the outer perimeter side can be made smaller than the inclined angle on the inner perimeter side.

Each of the information layers and the separating layer 7 described above may be sequentially formed on the protective substrate 1, followed by formation or bonding of the protective substrate 3, or may be sequentially formed on the transparent substrate 3, followed by formation or bonding of the transparent substrate 1. The latter pattern is suitable particularly for the case where the transparent substrate 1 is a thin sheet like a substrate having a thickness not more than 0.3 mm. In this case, uneven patterns of a groove as a groove for guiding a laser light, an address signal and the like need to be formed on the surfaces of the protective substrate 3 and the separating layer 7. Namely, the uneven patterns need to be transcribed from previously formed desired uneven patterns of a stamper and the like. At that time, especially when the layer is thin like the separating layer 7, to which a normally used injection method is difficult to apply, a 2P (photo-polymerization) method can be applied.

In the case where the recording layer 12 of the above-mentioned optical recording medium is a rewritable type, generally, since the recording layer 12 in a state of having been formed is in an amorphous state, an initialization process is performed where the layer is annealed with a laser light or the like to come into a crystal state, thereby obtaining a complete disc, to perform recording/reproduction.

Figure 5:
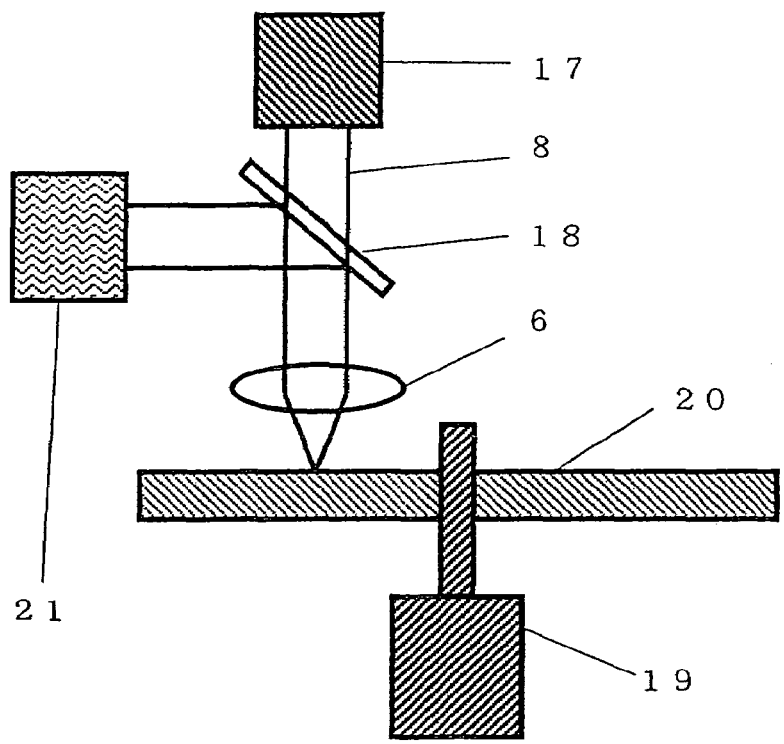
FIG. 5 is a schematic view showing an example of a recording/reproduction device used for the optical information recording medium of the present invention.

FIG. 5 shows a schematic view of one example of a configuration, consisting of minimum essentials of a recording/reproduction device for performing recording/reproduction, of the optical information recording medium according to the present invention. The laser light 5 emitted from a laser diode 17 is focused through a half mirror 18 and the objective lens 6 on an optical information recording medium 20 being rotated by a motor 19. This reflected light is incident on a photo detector 21 to detect a signal.

Figure 6:
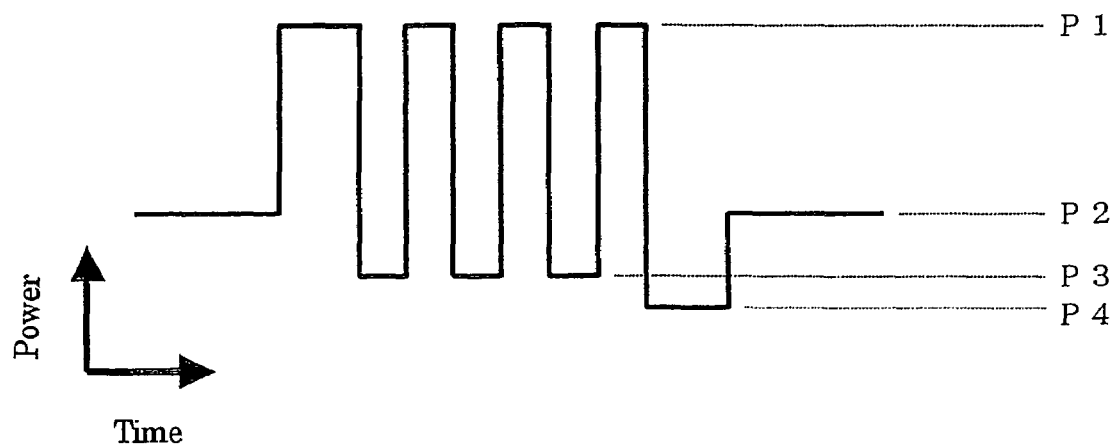
FIG. 6 is a schematic view showing one example of a pulse waveform for use in recording/reproduction of the optical information recording medium of the present invention.

When the information signal is recorded, the intensity of the laser light 5 is modulated among a plurality of power levels. For the modulation of the laser intensity, a driving current of a semiconductor laser may be preferably modulated, or means such as an electric optical modulator or an acoustic optical modulator may be used. In a portion where a mark is formed, a single rectangular pulse of a peak power P1 may be used. In the case of forming a particularly long mark, however, a recording pulse train consisting of a plurality of pulses modulated between the peak power P1 and a bottom power P3 (provided that P1>P3) is used as shown in FIG. 6, with the aim of removing excess heat and making mark widths uniform. Further, after the rearmost pulse, a cooling section of a cooling power P4 may be provided. In a portion where a mark is not formed, pulses are held constant at a bias power P2 (provided that P1>P2).

Here, positions of mark edges become non-uniform attributed to each of patterns of the length of the mark to be recorded and further the lengths of spaces before/after the mark, which may cause an increase in jitter. In the recording/reproduction method of the optical information recording medium of the present invention, in order to prevent the above state and improve the jitter, the respective positions or lengths of the pulses of the pulse train are adjusted according to need, or can even be compensated, such that the edge position per pattern is made uniform.

The present invention is more specifically described by an example below, but it is not restricted by the example.

As a master for producing a protective substrate, one produced by the following method was used. In a cutting step, a laser light for cutting was inclined in the range of 0 to 30 degrees from the center of the master, to be incident on the master on the outer perimeter side which was outside a border at a distance of a master radius of 45 mm. This resulted in production of a master where an inclined angle on the outer perimeter side of a guide groove was smaller than an inclined angle on the inner perimeter side of the guide groove by 0 to 30 degrees.

As the protective substrate used was one which was made of a polycarbonate resin and had a diameter of about 12 cm, a thickness of about 1.1 mm, a guide groove pitch of 0.32 µm and a guide groove depth of about 20 nm.

On the surface of the protective substrate with a guide groove formed thereon, the following layers were sequentially laminated by sputtering in the below written order as a second information layer. Those laminated layers were: a reflective layer comprising $Ag_{98}Pd_1Cu_1$ and having a thickness of 80 nm; a reflective layer comprising Al and having a thickness of 10 nm; an upper side dielectric layer comprising $(ZnS)_{80}(SiO_2)_{20}$ and having a thickness of 15 nm; an upper side interface layer comprising C and having a thickness of 2 nm; a recording layer comprising $Ge_{45}Sb_5Te_{55}$ and having a thickness of 10 nm; a lower side interface layer comprising $(ZrO_2)_{25}(SiO_2)_{25}(Cr_2O_3)_{50}$ and having a thickness of 5 nm; and a lower side dielectric layer comprising $(ZnS)_{80}(SiO_2)_{20}$ and having a thickness of 55 nm.

The same groove pattern as that formed on the protective substrate was transcribed to the surface of the second information layer by the 2P method using an ultraviolet ray curing resin, to form a separating layer having a thickness of 25 µm.

On the surface of this separating layer, the following layers were sequentially laminated by sputtering in the below written order as a first information layer. Those laminated layers were: a transparency adjusting layer comprising $TiO_2$ and having a thickness of 23 nm; a reflective layer comprising $Ag_{98}Pd_1Cu_1$ and having a thickness of 10 nm; an upper side dielectric layer comprising $(ZrO_2)_{35}(SiO_2)_{35}(Cr_2O_3)_{30}$ and having a thickness of 13 nm; an upper side interface layer comprising $(ZrO_2)_{50}(Cr_2O_3)_{50}C$ and having a thickness of 3 nm; a recording layer comprising $Ge_{45}Sb_5Te_{55}$ and having a thickness of 6 nm; a lower side interface layer comprising $(ZrO_2)_{50}(Cr_2O_3)_{50}$ and having a thickness of 5 nm, and a lower side dielectric layer comprising $(ZnS)_{80}(SiO_2)_{20}$ and having a thickness of 36 nm.

A polycarbonate sheet was bonded to the surface of the first information layer, using an ultraviolet ray curing resin, to form a transparent substrate having a thickness of 75 µm. Subsequently, this disc was annealed with a laser light from the transparent substrate side, while being rotated, to initialize the whole surface of the recording layer in each of the information layers.

It is to be noted that, a target having a diameter of 200 mm and a thickness of 6 mm was used for forming each of the layers. The transparency adjusting layer, the dielectric layer and the interface layer were formed using an RF power source of 2 kW, the reflective layer was formed using a DC power source of 2 kW, and the recording layer was formed using a DC power source of 500 W. While gas pressure held at 0.2 Pa, the recording layer was formed using an Ar—$N_2$ mixed gas ($N_2$ partial pressure of 3%) as a sputter, and the other layers were formed using an Ar gas alone as a sputter.

Here, for controlling the layer thickness difference between the inclined face portions on the two sides of the guide groove in formation of each of the layers, in the outer side region and the inner side region, which were separated with a border at a radius distance of 45 mm, being longer than a half the disc radium of 30 mm, the inclined angle of the guide groove was changed such that the inclined angle on the outer perimeter side was smaller than the inclined angle on the inner perimeter side. As shown in Table 1, in each of discs A to G, the inclined angle difference was changed in the outer side region by an inclined angle difference range of 0 to 30 degree. It should be noted that the inclined angle difference in the inner side region was set so as to be smaller than the inclined angle difference in the outer side region.

A cross section of a position at a radius distance of 55 mm on each of the discs was observed with a transmission electron microscope, to measure the inclined angle difference between the inner perimeter side and the outer perimeter side of the guide groove, and thicknesses $d_1$ and $d_2$ of the first information layer in the respective inclined face portions. Further, the disc was divided into three regions: an inner perimeter region (region with a radius not larger than 25 mm); a middle perimeter region (region with a radius more than 25 mm and not more than 40 mm); and an outer perimeter region (region with a radius more than 40 mm), and noise levels were measured by a method shown below.

Using an optical system having a wave length of 405 nm a lens numerical aperture of 0.85, a 2T signal having a mark length of 0.154 μm and a 9T signal having a mark length of 0.693 μm were recorded in the (1-7) modulation system on a portion frontwardly projected as seen from the laser light incident side, which was either the groove or a space between the grooves of each of the discs, while each of the discs was rotated at a linear speed of 5 m/s.

At the time of recording a signal, a pulse waveform shown in FIG. 6 was used. In the case of the 2T signal, a single pulse having a width of 13.7 ns was used. In the case of the 9T signal, a pulse train, consisting of a top pulse with a width of 20.5 ns and subsequent seven pulses with a width of 6.9 ns at an interval of 6.9 ns, was used. P3 and P4 were 0 mW, and each reproduction power was 0.7 W.

Under such conditions, alternate recording of the 2T signal and the 9T signal on an unrecorded track was repeated eleven times in total, and in a state where the 2T signal had been recorded, the C/N ratio was measured using a spectrum analyzer. Further, the 9T signal was recorded, and an erasing rate, namely an attenuation ratio of the wave width of the 2T signal was also measured using the spectrum analyzer. P1 and P2 were arbitrarily changed for measurement. On P1, a value 1.3 times as large as power with which the wave width became lower than the maximum value by 3 dB was used as a setting power. On P2, a central value in the range of power with which the erasing rate exceeded 25 dB was used as a setting power. In any of the discs, the setting power was 10 mW on P1 and 4.0 mW on P2 in the fist information layer, and 10 mW on P1 and 3.5 mW on P2 in the second information layer. The noise level of each of the discs with the above setting powers was shown in Table 1. It is to be noted that, although only the noise levels in the outer perimeter regions were shown in Table 1, the noise level of the inner perimeter regions and the middle perimeter regions were similar to the noise levels of the outer perimeter regions.

TABLE 1

| Disc | Inclined angle difference | $d_2/d_1$ | Noise level(dbm) |
| --- | --- | --- | --- |
| A | 0 degree | 1.25 | −53.5 |
| B | 5 degree | 1.20 | −55.0 |
| C | 10 degree | 1.15 | −57.0 |
| D | 15 degree | 1.10 | −59.0 |
| E | 20 degree | 1.05 | −60.0 |
| F | 25 degree | 1.05 | −60.5 |
| G | 30 degree | 1.05 | −60.5 |

As apparent from Table 1, with the inclined angle difference not smaller than 20 degrees, the ratio $d_2/d_1$ approached 1 and a favorable noise level was obtained in the outer perimeter region. Further, in the inner perimeter region and the middle perimeter region, there was observed a tendency of the ratio $d_2/d_1$ to approach 1 when the two inclined angles were made uniform. Especially in the inner perimeter region, it is possible, by setting of the inclined angle difference to not larger than 10 degrees, to stably obtain the $d_2/d_1$ value in the range of 1±0.05.

As thus described, in an optical information recording medium having a rewritable translucent information layer, it is possible by controlling the form of an inclined face of a guide groove to realize favorable signal quality having a low noise level.

The optical information recording medium according to the present invention is effective especially for the use of recording/reproducing large volumetric information such as image information.

What is claimed is:

1. An optical information recording medium comprising:
one or more information layers including a recording layer for recording/reproducing an information signal by irradiation with a laser light; and
a separating layer or a protective substrate on which a first information layer of the information layer on the irradiation face side is formed,
the separating layer or the protective substrate having a guide groove spirally or concentrically formed on a surface thereof,
respective inclined planes on the inner perimeter side and the outer perimeter side of the guide groove having inclined angles α and β with respect to a bottom face of the guide groove,
the guide groove having two or more dissymmetric regions in the radius direction where the inclined angles α and β are different, wherein the dissymmetric regions comprise first and second dissymmetric regions having the following relations: α-β≦10 degrees in the first dissymmetric region, and α-β≧20 degrees in the second dissymmetric region.

2. The optical information recording medium according to claim 1, wherein the protective substrate has a radius r and at least one of the first and second dissymmetric regions is formed at a distance larger than r/2 from the center of the protective substrate in the radius direction.

3. The optical information recording medium according to claim 1, wherein the first dissymmetric region is formed at a distance smaller than r/2 from the center of the protective substrate in the radius direction, whereas the second dissymmetric region is formed at a distance larger than r/2 from the center of the protective substrate in the radius direction.

4. The optical information recording medium according to claim 1, wherein the optical information recording medium comprises a single-sided multi-layered configuration, and wherein at least a second information layer, a separating layer having a second guide groove and the first information layer are sequentially laminated on the protective substrate having the first guide groove.

5. The optical information recording medium according to claim 1, wherein the information layer has roughly agreeing thicknesses in the inclined face portion on the inner perimeter side and in the inclined face portion on the outer perimeter side in the dissymmetric region.

6. A method for producing an optical information recording medium, comprising one or more information layers including a recording layer for recording/reproducing an information signal by irradiation with a laser light, and a separating layer or a protective substrate on which a first information layer of the information layer on the irradiation face side is formed, the separating layer or the protective substrate having a guide groove spirally or concentrically formed on a surface thereof, wherein inclined planes are formed on the inner perimeter side and the outer perimeter side of the guide groove, respectively, and the inclined planes have inclined angles $\alpha$ and $\beta$ with respect to a bottom face of the guide groove, the guide groove has two or more dissymmetric regions in the radius direction where the inclined angles $\alpha$ and $\beta$ are different, and the dissymmetric regions comprise first and second dissymmetric regions having the follow relations: $\alpha-\beta \leq 10$ degrees in the first dissymmetric region, and $\alpha-\beta \geq 20$ degrees in the second dissymmetric region, wherein the production method comprises forming the protective substrate by molding with a stamper as a mold produced from a master, and as the master, one is used which has first and second dissymmetric regions where the inclined angles $\alpha$ and $\beta$ are different.

7. The production method according to claim 6, wherein the production method comprises forming a resist layer on a substrate for a master, collecting a laser light with a condenser lens to cut the resist layer for forming a mask pattern, and etching the mask pattern to form a spiral or concentric guide groove, and wherein a light axis of the laser light to be incident on the condenser lens is inclined to cut the resist layer.

8. The production method according to claim 6, wherein the production method comprises forming a resist layer on a substrate for a master, collecting a laser light with a condenser lens to cut the resist layer for forming a mask pattern, and etching the mask pattern to form a spiral or concentric guide groove, and wherein two collected laser lights are used to cut the resist layer.

* * * * *